Patented May 17, 1938

2,117,378

UNITED STATES PATENT OFFICE 2,117,378

SETTLING AND COAGULATING AGENT AND THE METHOD FOR MAKING AND USING THE SAME

George E. Tiffany, Durango, Colo., assignor, by mesne assignments, to Tiffany Products Corporation, Chicago, Ill., a corporation of Illinois No Drawing. Application November 7, 1935, Serial No. 48,791

12 Claims. (Cl. 252—6)

This invention relates in general to the coagulation and settling of solids held in fluid suspension and the method for making and using the same.

In a great many industrial processes of the present time it is necessary to deal with liquids containing in suspension a certain amount of solid material in finely divided form. Very frequently the solid material in suspension is one of the products which it is desired to retain as the product of the process. In other cases it is desired to remove the finely divided and suspended material from the liquid in order to further use the liquid. A number of examples of these instances may be found. In such cases the separation of the solid materials from the liquids may be effected by allowing the suspension to stand quietly for a period of time and thereby permit the solid material to settle out by force of gravity. Such procedure may be effective in some instances but usually the suspension separates out so slowly when treated in this fashion that much valuable time is consumed. The present invention overcomes this difficulty.

It is an object of this invention to prepare a new and improved settling and coagulating agent.

It is another object of this invention to provide a settling and coagulating agent which will cause extremely rapid precipitation of solid substances carried in a liquid medium in finely divided form.

It is another object of this invention to provide means for the more rapid and perfect coagulation of liquids carrying solids in suspension.

It is another object of this invention to produce a new and improved coagulating agent from the natural juices of exogenous plants.

It is another object of this invention to provide means for preserving for future use a settling agent prepared from natural plant juices.

Numerous other objects and advantages of the invention will be apparent from the following description, which discloses preferred modes of practicing the invention.

The present invention deals more particularly with a settling and coagulating agent from the natural juices of exogenous plants of the natural order of cactaceae and the methods of preparing and using the same. The term "cactaceae", which is derived from the commonly used word "cactus", is most often used to describe a large family of exogenous plants which may be described roughly as dicotyledonous herbs, shrubs or trees having the following characteristics: Stems mostly succulent; leaves minute or wanting (in a few cases with ample leaves); ovary inferior; stamens numerous; floral leaves (sepals and petals) usually many. They are related to the myrtles, evening primroses, mentzelias, etc., and are to be regarded as specially modified from this general type for growth in hot, dry climates. About 1000 species have been described, all natives of the New World, with the single exception (*Rhipsalie cassytha*, variety *mauritiana*). Some species, however, have become naturalized in many countries of the Old World. The most important genera are Mammillaria with spheroidal stems covered with tubercles; Echinocactus, with spheroidal stems vertically ribbed; Cereus, with elongated ribbed stems; Opuntia, with flattened, articulated stems. The settling and coagulating agent, which forms the subject matter of the present invention, may be obtained from the natural juices of any one or more of this exogenous group of plants and may be in particular obtained from any one of various American polypetalous, exogenous, leafless, spiny plants of the cactus family. In preparing the settling and coagulating agent, which forms the subject matter of the present invention, it has been found preferable to utilize a plant known as "*Opuntia cochinellifera*" or nopal cactus, a plant which grows quite commonly in the Western States and is sometimes colloquially referred to as the "prickly pear cactus." This variety of cactus is one of the most common variety of cacti growing in the United States.

In the preparation of the settling and coagulating agent, which forms the subject matter of the present invention, it has been found that a number of different methods may be employed. The simplest method comprises gathering the succulent, fleshy, pear-shaped stems of the cactus plant during those seasons of the year when the juice or fluid part of the vegetable is in full flow. The primary process of producing this agent consists merely of placing the freshly harvested, natural, crude, unprepared vegetable matter in a grinding machine, such as a sausage mill, and grinding the same until the raw material is transformed into segments of the approximate size of quarter inch cubes. The purpose of this segmentation is to cause the juice, or fluid content of the vegetable, to drain and flow as freely and unconstrainably as possible from the moist, soft, slightly cohering mass of pulpy matter produced by the grinding operation. For convenient designation this operation may be termed "bleeding", or "sapping". The juice which flows from these segments of the exogenous plants under consideration is of an adhesive, mucilaginous, or viscous consistency, and upon exposure to the air it slowly congeals, forming a sticky, paste-like substance of greenish color. Without permitting the juice to congeal, but only after considerable time has been consumed in the "bleeding" process, the conglomerate mass resulting from the above operations is placed in a strainer containing adequate meshes, or porous fabrications, through which the liquids are passed to separate them from the coarse, fibrous content of the vegetable matter being processed. This filtrated liquid and the sticky paste-like substance into which it congeals, as above mentioned, is the primary settling and coagulating agent.

In addition to the process above described, the vegetable may be cut up into relatively small pieces and the juice therefrom expressed in a suitable pulping or pressing machine. This juice will congeal upon standing in the same fashion as above described. It is also possible to prepare the agent in a powdered form by evaporating the expressed sap or juice obtained, as above described, in a suitable evaporator or even by the natural process of exposing it to the sun's rays in an open evaporating dish or container. The water contained in the juice will pass off leaving a light anhydrous powder.

It is also possible to prepare a powdered form of the settling agent in somewhat cruder fashion by placing the vegetable matter itself in a suitable drying oven and dehydrating it. At the present time it is thought that the most desirable range of temperature for dehydration of this vegetable lies between 100° and 135° Fahrenheit. Ordinarily the vegetable matter can be completely dried to a hard, brittle mass by subjection to this temperature for a period of about three to four hours. The hard, brittle mass may then be placed in a suitable crushing machine and pulverized. The powder resulting from this process contains a large quantity of the effective substance in the natural juice which acts as a settling and coagulating agent together with a somewhat indefinite quantity of fibrous materials of the plant which are apparently inert so far as settling and coagulating is concerned. It should be noted that a drying process employing the heat of the sun's rays may also be used. In such a case the plant material may be placed on suitable racks elevated from the ground or in similarly constructed trays whereby the maximum surface is exposed to the rays of the sun. The plant will become hardened and brittle and practically dehydrated in the course of a short time. It may then be treated as above described.

This powder may be refined by dissolving the powder in water. The active principle therein will be dissolved in the water and the non-water-soluble, fibrous parts of the plant will tend to settle out. The solution may then be drained off and evaporated down to powder form, as above described.

In utilizing this agent, if it is desirable to prepare the agent in the congealed form, as above described, it is necessary to preserve this congealed substance from deterioration. A number of divers expedients may be employed. To accomplish this a small quantity of salicylic acid may be added to the congealed liquid. It has also been discovered that the vegetable matter itself may be packed in cans or containers and preserved until such a time as it is desired to make the settling and coagulating agent therefrom and then subsequently process it. To accomplish this the vegetable matter may be placed in the containers, covered with water and immersed in a pan of boiling water. After the vegetable and the container therein has been heated for some time it may be removed and sealed. Similarly, the vegetable matter may be placed in water and the mixture brought to a boil and then placed in containers and sealed therein. It is also possible to preserve the expressed agent in the congealed form by storing it in a refrigerated chamber. The agent, when prepared in powdered form, does not undergo any apparent deterioration and, therefore, so far as present knowledge goes, does not require any preservative process.

The application of the present invention in process work will vary depending on the form in which the settling and coagulating agent has been prepared. If it has been prepared in the congealed form it may be used directly by adding a predetermined quantity thereof to the liquor to be settled and coagulated. It has been found desirable, however, for the sake of physical convenience in bringing about a rapid intermixture of the coagulating agent with the liquor itself, to dilute the congealed agent with a quantity of water to render it somewhat more fluid. It is thought that the congealing of the agent results from the evaporation of a certain amount of water from the natural juices of the plant and that in rendering it more fluid enough water should be added to restore the quantity of water lost during the congealing of the agent. If the agent has been prepared in powdered form it is possible to add a predetermined quantity of the powder directly to the liquid to be settled. It has been found preferable, however, to dissolve a predetermined quantity of the powder in a predetermined quantity of water, making a solution thereof somewhat more dilute in concentration and consistency than the original and natural juice of the plant and adding this to the liquor to be settled and coagulated.

The application of the present invention in industry has been found to be quite widespread. For instance, in mining operations there is a process of ore preparation known as the "flotation process." In mining parlance, the term "ore" is applied to all material or to any part of the material mined and delivered to the extraction equipment for the extraction of the desired mineral whether or not individual pieces or bodies of the ore contain the desired mineral. In the flotation process the ore is crushed and intermixed with water, and a suitable oil known as "flotation oil". The "gangue" containing the non-desired ore materials is thereby separated from the desired mineral-containing particles of the ore, the particles of the desired ore material being caught up in the liquid in the form of a suspension. This liquid suspension is then separated from the liquid containing the "gangue" ore material and the particles of the desired ore material refined therefrom. The suspension liquid containing the desired ore material particles is frequently referred to as the "concentrates". The part containing the "gangue" or non-desired ore material in suspension in the aqueous liquid, and which remains after the separation of the "concentrates", may be settled, the liquid drawn off and the residual ore material discarded in the waste dump "tailings", or the "gangue" suspension may be disposed of by pumping it directly to a disposal bed, without settling. The "concentrates" are then run into large settling basins and allowed to separate out of the liquid by force of gravity. This settling process requires a great deal of time. Furthermore, this settling process takes place in a sort of two-phase cycle. As the "concentrates" settle, the relatively clear supernatant liquid may be drained off finally leaving in the settling basin at the bottom a hard-caked mass of "concentrates" and on top thereof a layer of very fluid mud known as "slimes." The "slimes" still contain too much moisture for suitable handling in the drying ovens; therefore, it is necessary to shovel off the "slimes" and place them in large porous sacks thereby uncovering the harder and more solid "concentrates" underneath. The "concentrates" may then be shoveled out of the settling basin and placed in the drying oven. The "slimes," on the other hand, after being "sacked" as it is called, must be allowed to stand for a period of several days during which the water therein drains out of the sacks and leaves the "slimes" in a more solid form suitable for drying in the ovens.

It will be seen that this process requires a great deal of time and considerable labor. It has been found that the present invention may be applied to this mineral separation process with exceptionally fine results. When the "concentrates" from the flotation process are run into the settling basins, a suitable quantity of the present settling and coagulating agent may be added to the "concentrates" and agitated therewith for a period of three or four minutes. The agitation may then be stopped and the materials allowed to settle. The settling begins to take place almost immediately and proceeds very rapidly. In the case of some actual experiments which have been performed with certain "concentrates," it was found that, without the present agent, the settling required a period in excess of ten hours before the liquor could be drawn off and the sacking process, above described, begun. When the present settling and coagulating agent was used, however, it was possible to commence drawing off the supernatant liquor fifteen minutes after the agitation was finished. This liquor was pumped off slowly over a period of about an hour at which time the entire mineral-containing material suspended in the liquor had been precipitated on the bottom of the tank in solid form capable of being immediately transferred to the drying or roasting ovens, the "slimes" and the "sacking" thereof being entirely eliminated.

Another application in which the present invention has been found extremely useful is in the precipitation and settling of sewage-containing water. A number of samples of sewage sludge have been taken and allowed to stand over a period of time to determine whether or not any appreciable settling took place upon standing. It was found that in such instances the fetal matter in the sewage settled out very slowly. By reason of the high percentage of organic matter present, the liquids seem to be somewhat colloidal in character. When a predetermined quantity of the present settling and coagulating agent is added to the sewage liquor and stirred therewith for a short time and then allowed to stand, the fetal and solid matter separates out with astonishing rapidity leaving a substantially clear supernatant liquid which may be drawn off and subjected to any suitable bacteria-killing process before returning it to the water-shed. The fetal and solid matter in the sewage will be found to have been precipitated against the bottom of the container in a solid cake in suitable form for drying and pulverizing or otherwise handling. The fetal and solid matter thus extracted from the sewage liquor may then be disposed of readily by incineration or may be subjected to suitable processes whereby to manufacture a fertilizer therefrom.

Another application of the present invention may be found in the treatment of water to be used in commercial processes and for boiler feed purposes. Very frequently water which is to be utilized for such purposes is muddy and contains relatively high quantities of foreign suspended matter. Such water must undergo some kind of treatment to remove the suspended matter. It has been discovered in connection with the present invention that a predetermined quantity of the settling and coagulating agent may be added to a settling tank or basin containing such turbid water and thoroughly stirred therein. The suspended solids will begin to precipitate out almost immediately.

The wide application of the present invention in industry may be further seen from its use in connection with the preparation of a number of chemical substances in the field of chemical compound manufacture, such as, for instance, a product commonly known as "silk-finished magnesium carbonate", a very finely ground powder which is practically insoluble in water and which remains suspended in solution a very long time. In the manufacture of this chemical, the recovery of the magnesium carbonate from the liquid suspension in which it is manufactured is quite expensive by reason of the fact that the carbonate is in very finely divided form and does not settle out, or filter out, readily. If a predetermined quantity of the present settling and coagulating agent is thoroughly intermixed in a suspension of magnesium carbonate the magnesium carbonate will settle out of solution almost immediately. The peculiar characteristics of the present agent will then become peculiarly applicable in removing the agent from the magnesium carbonate. If the precipitation has taken place over a filter bed or on top of a porous material, such as, a heavy canvas, a stream of washing water may be drawn through the precipitated bulk of magnesium carbonate which contains a certain amount of the settling and coagulating agent. The settling and coagulating agent will be dissolved in the water and washed out leaving a practically chemically pure product in suitable form for drying. The present invention may be similarly applied in the preparation of a wide variety of other so-called dry chemicals.

In the above specific examples of various uses to which the present invention may be put it will be noted that reference was made to the use of a "predetermined quantity of the settling and coagulating agent". It is difficult to set forth an exact quantity of the agent to be used in any particular instance because the exact quantity necessary depends on a number of factors which must be experimentally determined in connection with a specific use. The amount of agent to be used will vary depending upon the type of substance which is being settled. It will also vary depending upon the type of particle size and the speed of coagulating desired. The amount necessary may be very readily determined, however, by empirical analysis. One convenient method for accomplishing this is to take a quantity of the liquid to be treated and prepare a number of small samples thereof adding different quantities of the settling agent to each of the samples and determining which quantity of agent gives the best results. A number of examples may serve to indicate in general the approximate quantities of the agent necessary in various different applications. For instance, in dealing with certain "concentrates" taken from a well-known flotation mill, ten pounds of the congealed agent were used in settling a quantity of concentrate liquor containing approximately two and one-half tons of solid "concentrates". A similar quantity was utilized in the sewage precipitation and turbid water tests.

In dealing with a number of dry chemicals, as above described, the following results were obtained. For instance, in the precipitation of magnesium carbonate, fourteen grains of congealed agent were diluted with one dram of water. A quantity of magnesium carbonate liquor was taken which liquor contained about thirty grains of magnesium carbonate to about one-half ounce of water. To about one-half ounce of such liquor, ten drops of the diluted agent were added which correspond to about two and one-half grains of diluted agent prepared as just stated above. Very rapid settling and coagulation resulted.

Similarly, in settling out milk of bismuth the following results were obtained. To about one ounce of milk of bismuth was added about one ounce of water in a beaker. This preparation contains about two and one-half grains of bismuth oxide to each dram of liquid. To this liquor were added about ten drops of a diluted agent prepared by adding one dram of water to fourteen grains of the agent. Very rapid settling and coagulation resulted.

It is to be understood that the examples, above set forth, of the various uses of the present invention and its various methods of preparation were intended by way of illustration of the present invention and not by way of limitation thereof, the scope of which is commensurate with the following claims.

Having thus described the invention what is claimed as new and desired to be secured by Letters Patent is as follows:

1. A settling and coagulating agent containing substantially all the water soluble constituents of the juice of exogenous plants of the natural family cactaceae.

2. A settling and coagulating agent containing substantially all the water soluble constituents of the juice of plants of the species *Opuntia cochinellifera*.

3. The process of assisting the settling or coagulation of material in aqueous suspension comprising adding to the suspension a settling agent comprising substantially all the constituents existing in the dried juice of exogenous plants of the natural family cactaceae.

4. The process of assisting the settling or coagulation of material in aqueous suspension comprising adding to the suspension a settling agent comprising substantially all the constituents existing in the dried juice of plants of the species *Opuntia cochinellifera*.

5. The process of assisting the settling and coagulation of material in aqueous suspension comprising adding to the suspension an aqueous extract of the juice of exogenous plants of the natural family cactaceae.

6. The process of assisting the settling and coagulation of material in aqueous suspension comprising adding to the suspension an aqueous extract of the juice of plants of the species of *Opuntia cochinellifera*.

7. The process of assisting the settling and coagulation of material in aqueous suspension comprising adding to the suspension a settling agent comprising the powder derived by drying the juice of exogenous plants of the natural family cactaceae.

8. The process of assisting the settling and coagulation of material in aqueous suspension comprising adding to the suspension a settling agent comprising the powder derived by drying the juice of plants of the species *Opuntia cochinellifera*.

9. The process of assisting the settling and coagulation of material in aqueous suspension comprising adding to the suspension a settling agent comprising the substantially unaltered constituents of the juice of exogenous plants of the natural family cactaceae.

10. The process of assisting the settling and coagulation of material in aqueous suspension comprising adding to the suspension a settling agent comprising the substantially unaltered constituents of the juice of plants of the species *Opuntia cochinellifera*.

11. In the process of ore separation which comprises the formation of slimes, concentrates and the like, containing ore material in suspension in an aqueous liquid, and the separation of the ore material from the liquid by settling, the step of assisting the settling or coagulation of material in the aqueous suspension comprising adding to the suspension a settling agent comprising substantially all the constituents existing in the dried juice of exogenous plants of the natural family cactaceae.

12. In the process of ore separation which comprises the formation of slimes, concentrates and the like, containing ore material in suspension in an aqueous liquid, and the separation of the ore material from the liquid by settling, the step of assisting the settling or coagulation of material in the aqueous suspension comprising adding to the suspension a settling agent comprising substantially all the constituents existing in the dried juice of plants of the species *Opuntia cochinellifera*.

GEORGE E. TIFFANY.